United States Patent [19]

Hayes

[11] 4,430,523

[45] Feb. 7, 1984

[54] GRIPPING JAW DEVICE FOR ELONGATED MEMBERS SUCH AS ELECTRICAL CONDUCTORS

[76] Inventor: Derek Hayes, Home Farm Cottage, St. Michael, Bungay, Suffolk NR35 1NF, England

[21] Appl. No.: 264,955

[22] Filed: May 18, 1981

[51] Int. Cl.[3] ...................... H01R 13/58; F16G 11/04

[52] U.S. Cl. ................................ 174/135; 24/136 R; 339/103 M; 339/107

[58] Field of Search .................... 174/65 R, 65 G, 135, 174/153 G, 155; 24/115 M, 136 R; 339/103 R, 103 B, 103 C, 103 M, 107

[56] References Cited

U.S. PATENT DOCUMENTS

| | | | |
|---|---|---|---|
| 1,832,138 | 11/1931 | Pounder | 174/155 |
| 2,265,057 | 12/1941 | Burt | 339/107 |
| 2,952,730 | 9/1960 | Simonds | 174/155 X |
| 3,056,852 | 10/1962 | Sachs | 339/103 B X |
| 3,127,471 | 3/1964 | Greiner | 174/135 |
| 3,229,026 | 1/1966 | Sulzer | 174/65 G |
| 3,499,097 | 3/1970 | Widstrand | 174/65 G |

FOREIGN PATENT DOCUMENTS

| | | | |
|---|---|---|---|
| 2315409 | 10/1974 | Fed. Rep. of Germany | 174/135 |
| 2259462 | 8/1975 | France | 174/135 |
| 1383301 | 2/1975 | United Kingdom | 339/107 |
| 1559789 | 1/1980 | United Kingdom | 339/103 M |
| 2039426 | 8/1980 | United Kingdom | 339/103 M |

*Primary Examiner*—Laramie E. Askin

*Attorney, Agent, or Firm*—Howson and Howson

[57] ABSTRACT

In a device, for example an electrical coupling device, for locating or gripping an elongated member, for example an insulated conductor or cable, there is provided the combination of a pair of jaws and a camming means into which the pair of jaws is insertable for the purpose of urging the jaws towards one another to locate or grip the elongated member. To enable the device to accommodate elongated members of different sizes, the elongated member-engaging face of at least one of the jaws is provided with a plurality of spaced-apart projections, for example pimples and/or ridges, which, when the pair of jaws is inserted into the camming means to bring said faces into confrontation with one another, project towards the elongated member-engaging face of the other jaw.

22 Claims, 12 Drawing Figures

GRIPPING JAW DEVICE FOR ELONGATED MEMBERS SUCH AS ELECTRICAL CONDUCTORS

Figure 1:
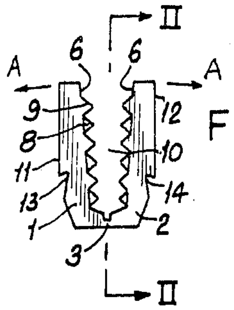

This invention relates to an improved gripping or locating device comprising a pair of jaws. In particular, but not exclusively, the invention relates to a pair of jaws for gripping or locating an electrically insulated cable or conductor in an electrical coupling device.

In my British Patent Specification No. 1,559,789 (hereinafter referred to as "the aforesaid Specification") there are described various embodiments of electrical coupling devices each comprising a body portion having an electrically-insulating part with a recess in its surface, and electrically-conductive metallic piercing means mounted in said recess and extending generally in the direction of a pair of opposed sides of the recess but laterally spaced therefrom, and conductor-locating means comprising a pair of cooperating jaws movable relative to each other and having mutually confronting surfaces configured to receive between them and locate an insulated electrical conductor when said jaws are urged towards one another, at least one end of said pair of jaws being configured to enter into said recess and to allow entry of said piercing means between the jaws and piercing of said conductor by said piercing means when said one end of the jaws is advanced into said recess, the outer surfaces of said pair of jaws and said opposed surfaces of said recess being configured to produce a camming action such that advancing said jaws into said recess urges the jaws towards one another to locate said conductor at least during piercing of the conductor by the piercing means.

In the specification of my published British Patent Application No. 2039426A (hereinafter referred to as "the aforesaid Application") there is described an electrical coupling device of the kind comprising a housing, means within the housing for effecting electrical connection to one or more conductors of an electrical cable which enters the housing in use of the device and a cable grip for clamping the cable relative to the housing, which is characterised in that the cable grip comprises a pair of cooperating jaws adapted to receive the cable therebetween and camming means formed in the housing into which the pair of jaws with the cable therebetween can be pressed, said camming means being arranged to exert pressure on a pair of opposed surfaces of the pair of jaws to force the jaws towards one another to grip the cable when the jaws are pressed into the camming means in a direction substantially perpendicular to the path of the cable through the jaws, and said housing comprising means to limit movement of the jaws in the direction of said path when a tensile force is applied to the gripped cable in a direction tending to pull the cable out of the coupling device.

In the coupling devices of both the aforesaid Specification and the aforesaid Application there is a pair of cooperating jaws having for its purpose to locate or grip, respectively, an insulated electrical conductor or cable, respectively, and in use of the coupling devices the problem arises that the pair of jaws may be required to locate or grip a conductor or cable in a range of widely differing sizes, the problem being more pronounced in the case of the cable grip of the coupling device described in the aforesaid Application.

Ways in which this problem can be overcome have been suggested in both the aforesaid Specification and in the aforesaid Application. Thus, in the aforesaid Specification and in the aforesaid Application it has been proposed to employ a pair of jaws provided with a plurality of conductor- or cable-receiving slots of different sizes, for example as illustrated in FIG. 6b of the aforesaid Specification and FIG. 4 of the aforesaid Application. Again, in both the aforesaid Specification and the aforesaid Application, it has been proposed to employ a pair of jaws provided with a conductor- or cable-receiving slot of oval cross-section and in the aforesaid Application it has been proposed to provide packing pieces which can be inserted between the jaws of a pair to reduce the space available between the jaws for accommodating the cable.

The disadvantage of providing the user with a choice of ways in which to employ a pair of jaws in the above described coupling devices is that there will always be someone who makes the wrong choice, with the possible result that the jaws will not provide an effective conductor-locating or cable-gripping function.

The problem discussed above also arises in other situations where a pair of jaws is required to locate or grip one of a number of elongate members having a range of different cross-sectional areas, for example gripping one of a number of conduits of different sizes at an entrance to an electrical junction box.

The present invention aims to provide a combination of a pair of jaws and a camming means for urging the jaws together which at least largely eliminates the problem discussed above.

According to one aspect of the invention, the combination of a pair of jaws and a camming means into which the pair of jaws is insertable for the purpose of urging the jaws towards one another in order to locate or grip an elongate member between confronting faces of the two jaws, is characterised in that the elongate member-engaging face of one of the jaws is provided with a plurality of spaced-apart projections which, when said pair of jaws is inserted into the camming means to bring said faces into confrontation with one another, project towards the elongate member-engaging face of the other jaw. Preferably, both of said confronting faces are provided with a plurality of said projections.

According to another aspect of the invention, an electrical coupling device comprising the combination of a pair of jaws and a camming means into which the pair of jaws is insertable for the purpose of urging the jaws towards one another in order to locate or grip an insulated conductor or cable between confronting faces of the two jaws, is characterised in that the conductor- or cable-engaging face of one of the jaws is provided with a plurality of spaced-apart projections which, when said pair of jaws is inserted into the camming means to bring said faces into confrontation with one another, project towards the conductor- or cable-engaging face of the other jaw. Preferably, the conductor- or cable-engaging face of both the jaws is provided with a plurality of said projections.

In each of the above-recited aspects of the invention, the camming means may simply be a recess in a base member, opposed sides of the recess having a camming action on the jaws to urge them together when the pair of jaws is inserted into the recess.

The two jaws of the pair may be separate from one another, but preferably they are formed together, for example moulded as a single unit interconnected by a hinge formed integrally with the two jaws. In its simplest form, the hinge may be a thin strip of the material from which the jaws are made.

In a first embodiment of the invention, the two jaws are hingedly connected together at one end so that the angle between the elongate member-engaging faces of the two jaws can be varied and the elongate member-engaging face of each jaw is shaped so that when these two faces confront one another in use of the pair of jaws, there is a tapered gap between said two faces which increases in width in the direction away from the hinged connection. The elongate member-engaging face of at least one, and preferably both, of the jaws is provided with said spaced-apart projections and preferably at least some of these projections are in the form of ridges disposed substantially parallel to the hinging axis of the jaws.

Preferably, in this first embodiment the hinged connection between the jaws is of a resilient nature so that the jaws are biased in a direction tending to increase the angle between the elongate member-engaging faces of the two jaws.

In use of this first embodiment of the invention, it is preferred to arrange for the pair of jaws to be mounted captively in its associated camming means in such a way that the pair of jaws can only be partially removed from the camming means to a predetermined position for reception of the elongate member, for example an insulated conductor or cable, which is to be located or gripped by the jaws. In this predetermined position, which may be defined by the engagement of notches in outwardly facing surfaces of the jaws with the associated camming means, the elongate member-engaging faces of the two jaws are at a predetermined angle to one another, and when, in use of the pair of jaws, an elongate member is placed in the tapered gap between the two faces, it will come to rest at a distance from the hinged connection of the jaws which is dependent on the cross-sectional area and/or cross-sectional shape of the elongate member. When the pair of jaws, with the elongate member so placed between them, is subsequently pushed into the associated camming means, the spaced-apart projections on the elongate member-engaging faces will penetrate into the member and/or be compressed themselves to locate or grip the elongate member.

In a second embodiment of the invention, each jaw has an elongate member-receiving slot in a face thereof, which two faces, in use of the pair of jaws, confront one another with the slot in one jaw opposite the slot in the other jaw. In this embodiment, the slot-defining surface of at least one of the jaws is provided with said plurality of spaced-apart projections.

In this second embodiment, the projections on the slot-defining surface of one or both jaws may be in the form of pimples and/or ridges. In the case of ridges, these may be parallel to one another and disposed in the longitudinal direction of the slot and/or transversely thereof. The elongate member-receiving slot in each jaw may have such a cross-sectional shape that, when the pair of jaws is in use, the two slots define an elongate member-receiving hole of circular cross-section or non-circular cross-section, for example oval or pear shaped cross-section.

This second embodiment of the invention, especially in the case in which the slot-defining surfaces of both jaws are provided with said spaced-apart projections, is capable of locating or gripping a range of elongate members, for example electrically insulated conductors or cables, of widely differing sizes. Thus, when the pair of jaws is used for locating an insulated conductor, the minimum size of conductor that can be located is one which is just located by the tips of the projections when the jaws are urged together in their position of use. Insulated conductors of larger size than this minimum size are accommodated by penetration of the insulation by the tips of the projections. In the same way, when the pair of jaws is used to grip an insulated cable, different sizes of cables can be accommodated by different degrees of penetration of the projections into the insulation of the cable. In the case of locating or gripping elongate members which may be made of material which is at least as hard as the material of the jaws, a range of members of widely differing sizes can be located or gripped by the jaws by differing degrees of compression of the said plurality of projections.

Figure 2:
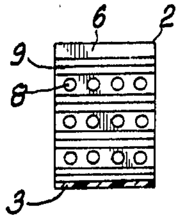
Figure 3:
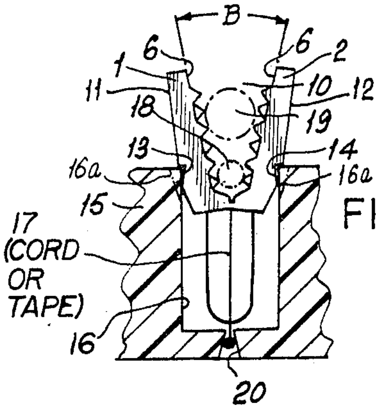
Figure 4:
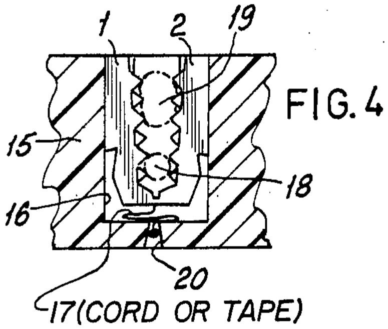
Figure 5:
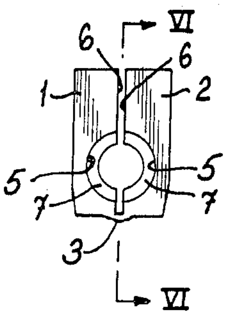
Figure 6:
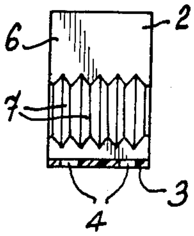
Figure 7:
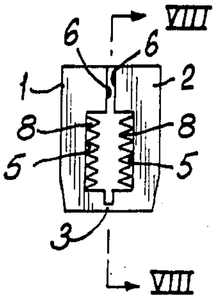
Figure 8:
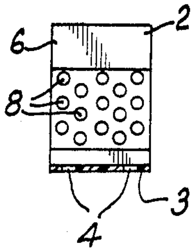
Figure 9:
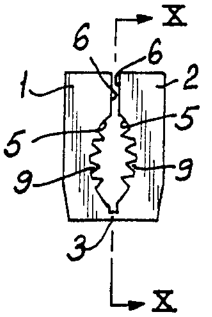
Figure 10:
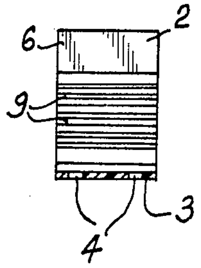
Figure 11:
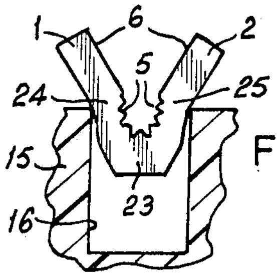
Figure 12:
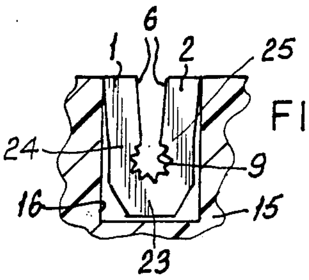

The invention will now be described, by way of example, with reference to the accompanying drawings, in which FIG. 1 is an end view of a first embodiment of a pair of jaws forming part of a combination in accordance with the invention, FIG. 2 is a sectional view taken on the line II—II of FIG. 1, FIGS. 3 and 4 are sectional views of a combination in accordance with the invention incorporating the pair of jaws of FIGS. 1 and 2, FIGS. 5, 7 and 9 are end views of three other embodiments of pairs of jaws forming part of combinations in accordance with the invention, FIGS. 6, 8 and 10 are sectional views taken on the lines VI—VI of FIG. 5, VIII—VIII of FIG. 7 and X—X of FIG. 9, respectively, and FIGS. 11 and 12 are end views of another embodiment of a combination in accordance with the invention.

Referring to FIGS. 1 and 2, the pair of jaws shown consists of jaws 1, 2, made for example of a plastic material, joined together by a hinge 3 in the form of a strip of plastic material moulded integrally with the two jaws. The hinge 3 is arranged to bias the two jaws away from one another as indicated by the arrow A.

The jaw surfaces 6 which confront one another when the jaws are close together, as shown in FIG. 1, define a tapered gap 10 between the jaws, which gap is of increasing width in the direction away from the hinge 3. Each of the surfaces 6 is provided with ridges 9, disposed substantially parallel to the hinging axis of the hinge 3, and rows of pimples 8, all moulded on the surfaces 6, the ridges and pimples alternating as shown in FIG. 2. In each of the outer faces 11, 12 of the jaws 1, 2 there is a respective notch 13, 14.

The pair of jaws 1, 2 is combined with a camming device to provide a combination in accordance with the invention. FIGS. 3 and 4 illustrate such a combination, in which the jaws 1, 2 of FIGS. 1 and 2 serve as a cable grip in a block 15 of electrically-insulating material forming part of an electrical coupling device of the kind described in the aforesaid Application. The jaws 1, 2 are shown held captive in a camming means in the form of a recess 16 in the block 15 by means of a cord or tape 17 secured at one end to the hinge 3 and at the other end in a hole 20 in the block 15. The cord or tape 17 may be moulded integrally with the hinge 3.

FIG. 3 shows the two jaws partially withdrawn from the recess 16 to the extent allowed by the cord tape 17, and in this position the notches 13, 14 engage the upper edges of the recess 16 under the influence of the resilience of the hinge 3. Each time the jaws 1, 2 are moved into this partially withdrawn position, the surfaces 6 of the two jaws will be inclined to one another at the same predetermined angle B.

With the jaws occupying the partially withdrawn position shown in FIG. 3, an insulated cable, which it is required to grip by means of the jaws 1, 2, is laid in the tapered gap 10, where it will rest in a position determined by its size. For example, a cable of small size might occupy the position indicated by the numeral 18 whereas a cable of larger size might occupy the position indicated by the numeral 19. The two jaws are then pressed into the recess 16 to the position shown in FIG. 4, and the cable will be firmly gripped irrespective of its original resting position in the gap 10 (provided, of course, that in the original resting position the upper surface of the cable is below the upper ends of the jaws 1,2). The longitudinally disposed ridges 9 on the surfaces 6 serve to resist any tendency for the cable to rise in the gap 10 as the jaws 1, 2 are pressed into the recess 16. When the jaws 1, 2 have been pressed down into the recess 16, the cord or tape 17 will be accommodated at the bottom of the recess under the jaws.

If desired, the upper edges of the recess 16 may be chamfered, as shown by the chain lines 16a in FIG. 3, so that the desired angle of inclination B of the surfaces 6 of the two jaws is obtained with the jaws withdrawn a smaller distance from the recess 16 than shown in FIG. 3.

Although the combination of FIGS. 3 and 4 has been described as being part of an electrical coupling device, it will be understood that the combination can be used in other devices, for example for gripping a conduit at the entrance to an electrical junction box.

Similar combinations to that described above with reference to FIGS. 3 and 4 may be provided by using, instead of the pair of jaws 1, 2 shown in FIGS. 1 and 2, the pair of jaws shown in FIGS. 5 and 6, FIGS. 7 and 8 and FIGS. 9 and 10 in combination with a camming means such as the recess 16 in the block 15 of FIGS. 3 and 4.

Referring to FIGS. 5 and 6, the pair of jaws shown again consists of jaws 1, 2, made for example of a plastic material, joined by a hinge 3 in the form of a strip of plastic material moulded integrally with the two jaws.

Each of the jaws 1, 2 has an elongate member-receiving slot 5 formed in its surface 6, which slots are opposite one another when the two jaws are close together as shown in FIG. 5. In the embodiment of FIGS. 5 and 6, the two slots 5 define, when the surfaces 6 of the two jaws are close to one another, a hole of substantially circular cross-section.

Moulded into the surface of each of the slots 5 is a series of ridges 7, these ridges being parallel to one another and lying in planes perpendicular to the longitudinal axes of the slots 5.

When the pair of jaws 1, 2 is to be used for locating an electrically insulated conductor in the electrical coupling device described in the aforesaid Specification, the hinge 3 is provided with one or more through-holes 4 to enable entry of the conductor piercing means between the jaws.

In the pair of jaws shown in FIGS. 7 and 8, the ridges 7 of the jaws of FIGS. 5 and 6 are replaced by pimples 8 moulded on the surface of the slots 5. In this embodiment, the two slots 5 define, when the surfaces 6 of the two jaws are close to one another, a hole of substantially rectangular cross-section.

In the pair of jaws shown in FIGS. 9 and 10, the ridges 7 of the jaws of FIGS. 5 and 6 are replaced by ridges 9 moulded into the surface of the slots 5, these ridges being substantially parallel to the longitudinal axes of the slots 5. In this embodiment the two slots 5 define, when the surfaces 6 of the two jaws are close to one another, a hole of substantially oval cross-section.

The invention is not, of course, limited to the various combinations described above with reference to FIGS. 1 to 10. For example, in a combination employing the pair of jaws of FIGS. 5 and 6, FIGS. 7 and 8 or FIGS. 9 and 10, the jaws 1, 2, may be provided with notches like the notches 13, 14 of the combination shown in FIGS. 3 and 4 for the purpose of setting the jaws in an open position for the reception of an elongate member. As an alternative to the notches 13, 14 of the combination shown in FIGS. 3 and 4, the faces 11, 12 of the jaws 1, 2 may be provided with recesses which extend only part way along the faces 11, 12. The upper edges of the walls of the recess 16 adjacent to the faces 11, 12 would then be provided with inwardly-directed projections to engage in these recesses in the partially withdrawn position of the pair of jaws.

Again, in the jaws of FIGS. 5 to 10, the hinge 3 of the jaws 1, 2 may be arranged to bias the jaws apart simply to facilitate the entry of an elongate member, for example an electrically insulated conductor or cable, between the jaws.

Again, in the combination shown in FIGS. 3 and 4, the faces 11, 12 of the jaws 1, 2 may be flared outwardly somewhat, at their ends remote from the hinge 3, so that when the jaws are pushed into the recess 16, the ends of the jaws remote from the hinge 3 will be forced inwardly over, and thus to some extent wrapped around, the elongate member gripped in the gap 10, in order to increase the area of contact between the jaws and the elongate member. A similar modification may be made to the jaws of FIGS. 5 and 6, FIGS. 7 and 8 and FIGS. 9 and 10, but in these cases it would be necessary to provide a wider gap between the confronting surfaces 6, above the slots 5, than is shown in FIGS. 5, 7 and 9.

The confronting surfaces 6 of each of the pairs of jaws described above need not be parallel to one another (as viewed from above in each of FIGS. 1, 5, 7 and 9). For example, when viewed from above, the gap between the confronting surfaces 6, when the jaws 1, 2 are close together, may be wider at the end faces of the jaws than in a region between the end faces, or wider in a region between the end faces of the jaws than at the end faces, or this gap may taper from one end face to the other. In the last mentioned case it is preferred that the narrowest portion of the gap should be at that end face of the jaws which is remote from the point of application of any possible tensile force to the elongate member located or gripped by the jaws.

It is not essential for the jaws 1, 2 to be hinged together in pairs. Although, for the sake of convenience for the user in gripping or locating an elongate member, it is preferred to connect the jaws 1, 2 with a hinge 3, it will be appreciated that two quite separate jaws can be employed for the purpose in exactly the same way as described above.

Instead of being hinged together, the two jaws may be joined by a relatively rigid connection member as shown in FIGS. 11 and 12. In these Figures, the two jaws 1, 2 are joined by a connection member 23, the jaws and the connection member being integrally moulded together from plastic material. Each of the jaws 1, 2 has an elongate member-receiving slot 5 formed in its surface 6, each of these slots being provided with a plurality of spaced-apart projections (for example ridges 9) like the jaws shown in FIGS. 5 to 10. FIG. 12 shows the pair of jaws inserted into a recess 16 in a block 15, the jaws 1, 2 being forced together by flexing in the regions designated by the numerals 24 and 25. When the jaws are partially withdrawn from the recess 16, the two jaws 1, 2 automatically assume the positions shown in FIG. 11.

What is claimed is:

1. The combination of a pair of jaws and a camming means into which the pair of jaws is insertable for the purpose of urging the jaws toward one another in order to locate or grip an elongated member, arbitrarily selected from a range of elongated members of different cross-sectional areas, between confronting faces of the two jaws, wherein said jaws are interconnected by a hinged connection at one end of the jaws, said hinged connection providing a hinging axis which, in use of the jaws, is disposed substantially parallel to the longitudinal direction of said elongated member, and the elongated member-engaging face of at least one of said jaws is provided with a plurality of spaced-apart projections which, when said pair of jaws is inserted into said camming means to bring said faces into confrontation with one another, project toward the elongated member-engaging face of the other jaw, at least some of said spaced-apart projections being in the form of ridges disposed substantially parallel to said hinging axis.

2. The combination of a pair of jaws and a camming means into which the pair of jaws is insertable for the purpose of urging the jaws toward one another in order to locate or grip an elongated member, arbitrarily selected from a range of elongated members of different cross-sectional areas, between confronting faces of the two jaws, wherein said jaws are interconnected by a hinged connection at one end of the jaws, said hinged connection providing a hinging axis which, in use of the jaws, is disposed substantially parallel to the longitudinal direction of said elongated member, and the elongated member-engaging face of at least one of said jaws is provided with a plurality of spaced-apart projections which, when said pair of jaws is inserted into said camming means to bring said faces into confrontation with one another, project toward the elongated member-engaging face of the other jaw, at least some of said spaced-apart projections being in the form of pimples.

3. The combination according to claim 1 or claim 2, wherein said jaws are molded as a single unit and said hinged connection is formed by a thin strip of the material from which the jaws are made.

4. The combination according to claim 1 or claim 2, wherein the major part of the surface of each jaw that engages said camming means is substantially plane.

5. The combination according to claim 1 or claim 2, wherein the elongated member-engaging face of each of said jaws is shaped so that when these two faces confront one another in use of the jaws, there is a tapered gap between said two faces which increases in width in the direction away from said hinged connection.

6. The combination according to claim 5, wherein said hinged connection is resilient so that said jaws are biased in a direction tending to increase the angle between the elongated member-engaging faces of said jaws.

7. The combination according to claim 5, wherein said pair of jaws is mounted captively in said camming means so that said jaws can only be partially removed from said camming means to a predetermined position for reception of an elongated member which is to be located or gripped by said jaws.

8. The combination according to claim 5, wherein said pair of jaws is mounted captively in said camming means so that said jaws can only be partially removed from said camming means to a predetermined position for reception of an elongated member which is to be located or gripped by said jaws, and comprising notches in the outwardly-facing surfaces of said jaws, said predetermined position being defined by the engagement of said notches with said camming means.

9. The combination according to claim 1 or claim 2, wherein each of said jaws has an elongated member-receiving slot in a face thereof, which two faces, in use of said pair of jaws, confront one another with the slot in one jaw opposite the slot in the other jaw, the slot-defining surface of at least one of said jaws being provided with said plurality of spaced-apart projections.

10. The combination according to claim 9, wherein said elongated member-receiving slot in each of said jaws has a cross-sectional shape such that, when said pair of jaws is in use, said slots define an elongated member-receiving hole of circular or non-circular cross-section.

11. The combination according to claim 1 or claim 2, wherein said camming means is formed by a recess with opposed sides in a base member, said opposed sides having a camming action on said jaws to urge them together when said pair of jaws is inserted into said recess.

12. An electrical coupling device comprising the combination of a pair of jaws and a camming means into which the pair of jaws is insertable for the purpose of urging the jaws toward one another in order to locate or grip an insulated conductor or cable, arbitrarily selected from a range of conductors or cables of different cross-sectional areas, between confronting faces of the two jaws, wherein said jaws are interconnected by a hinged connection at one end of the jaws, said hinged connection providing a hinging axis which, in use of the jaws, is disposed substantially parallel to the longitudinal direction of said conductor or cable, and the conductor- or cable-engaging face of at least one of said jaws is provided with a plurality of spaced-apart projections which, when said pair of jaws is inserted into said camming means to bring said faces into confrontation with one another, project toward the conductor- or cable-engaging face of the other jaw, at least some of said spaced-apart projections being in the form of ridges disposed substantially parallel to said hinging axis.

13. An electrical coupling device comprising the combination of a pair of jaws and a camming means into which the pair of jaws is insertable for the purpose of urging the jaws toward one another in order to locate or grip an insulated conductor or cable, arbitrarily selected from a range of conductors or cables of different cross-sectional areas, between confronting faces of the two jaws, wherein said jaws are interconnected by a hinged connection at one end of the jaws, said hinged connection provided a hinging axis which, in use of the jaws, is disposed substantially parallel to the longitudinal direction of said conductor or cable, and the conductor- or cable-engaging face of at least one of said jaws is provided with a plurality of spaced-apart projections which, when said pair of jaws is inserted into said camming means to bring said faces into confrontation with one another, project toward the conductor- or cable-engaging face of the other jaw, at least some of said spaced-apart projections being in the form of pimples.

14. An electrical coupling device according to claim 12 or claim 13, wherein said jaws are molded as a single unit and said hinged connection is formed by a thin strip of the material from which the jaws are made.

15. An electrical coupling device according to claim 12 or claim 13, wherein the major part of the surface of each jaw that engages said camming means is substantially plane.

16. An electrical coupling device according to claim 12 or claim 13, wherein the conductor- or cable-engaging face of each of said jaws is shaped so that when these two faces confront one another in use of the jaws, there is a tapered gap between said two faces which increases in width in the direction away from said hinged connection.

17. An electrical coupling device according to claim 16, wherein said hinged connection is resilient so that said jaws are biased in a direction tending to increase the angle between the conductor- or cable-engaging faces of said jaws.

18. An electrical coupling device according to claim 16, wherein said pair of jaws is mounted captively in said camming means so that said jaws can only be partially removed from said camming means to a predetermined position for reception of a conductor or cable which is to be located or gripped by said jaws.

19. An electrical coupling device according to claim 16, wherein said pair of jaws is mounted captively in said camming means so that said jaws can only be partially removed from said camming means to a predetermined position for reception of a conductor or cable which is to be located or gripped by said jaws, and comprising notches in the outwardly-facing surfaces of said jaws, said predetermined position being defined by engagement of said notches with said camming means.

20. An electrical coupling device according to claim 12 or claim 13, wherein each of said jaws has a conductor- or cable-receiving slot in a face thereof, which two faces, in use of said pair of jaws, confront one another with the slot in one jaw opposite the slot in the other jaw, the slot-defining surface of at least one of said jaws being provided with said plurality of spaced-apart projections.

21. An electrical coupling device according to claim 20, wherein said conductor- or cable-receiving slot in each of said jaws has a cross-sectional shape such that, when said pair of jaws is in use, said slots define a conductor- or cable-receiving hole of circular or non-circular cross-section.

22. An electrical coupling device according to claim 12 or claim 13, wherein said camming means is formed by a recess with opposed sides in a base member, said opposed sides having a camming action on said jaws to urge them together when said pair of jaws is inserted into said recess.

* * * * *